Patented Jan. 3, 1933

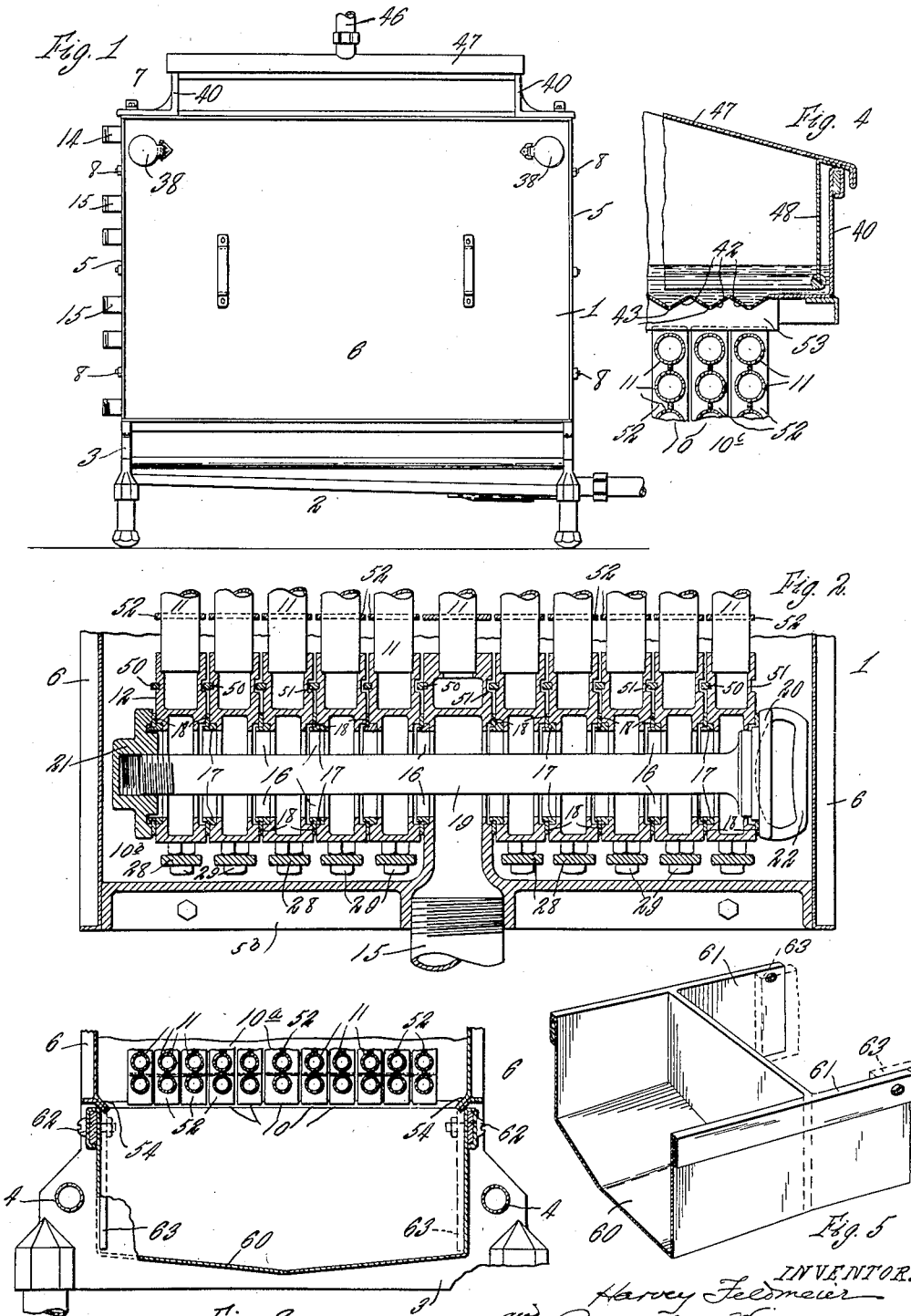

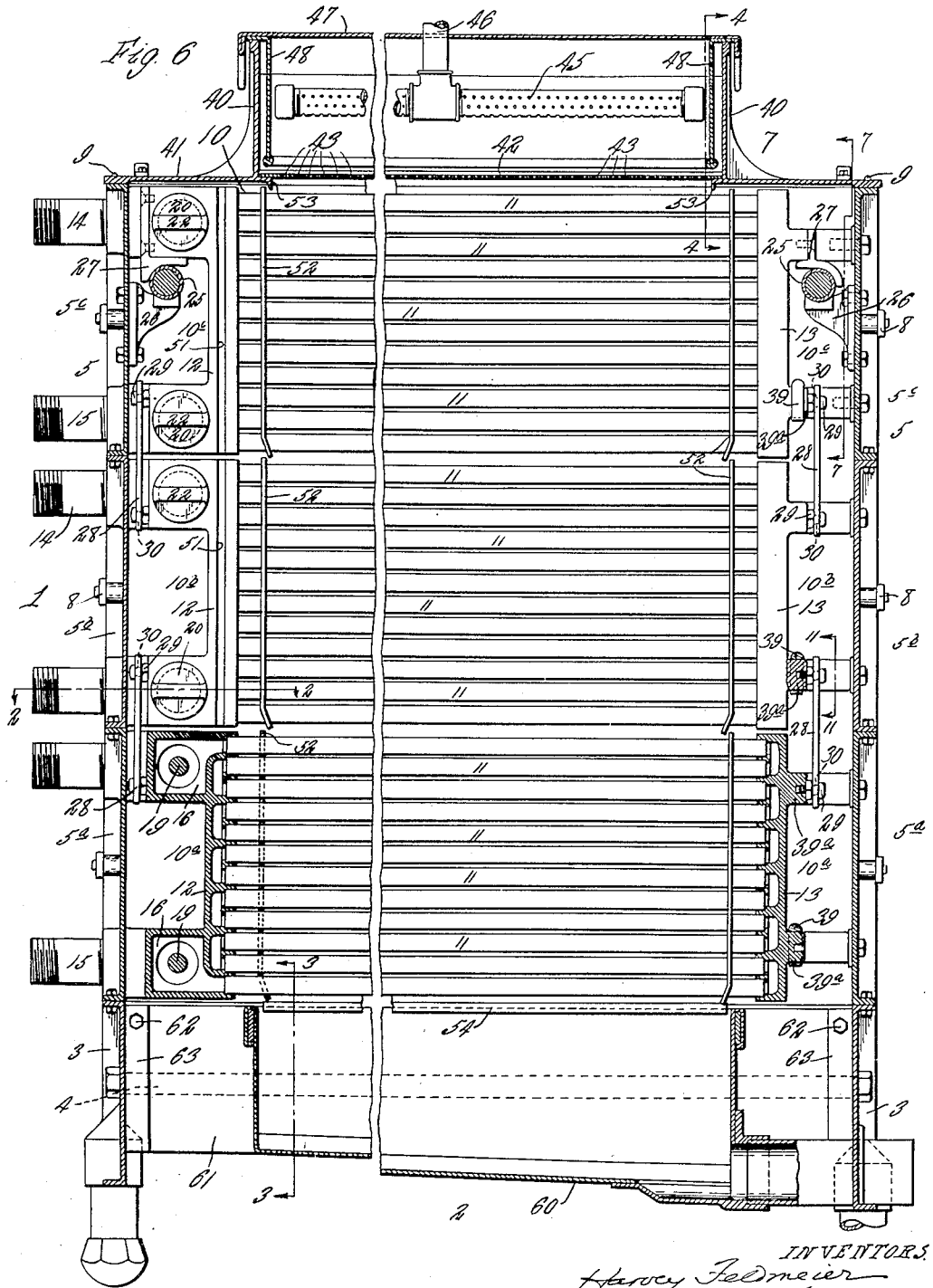

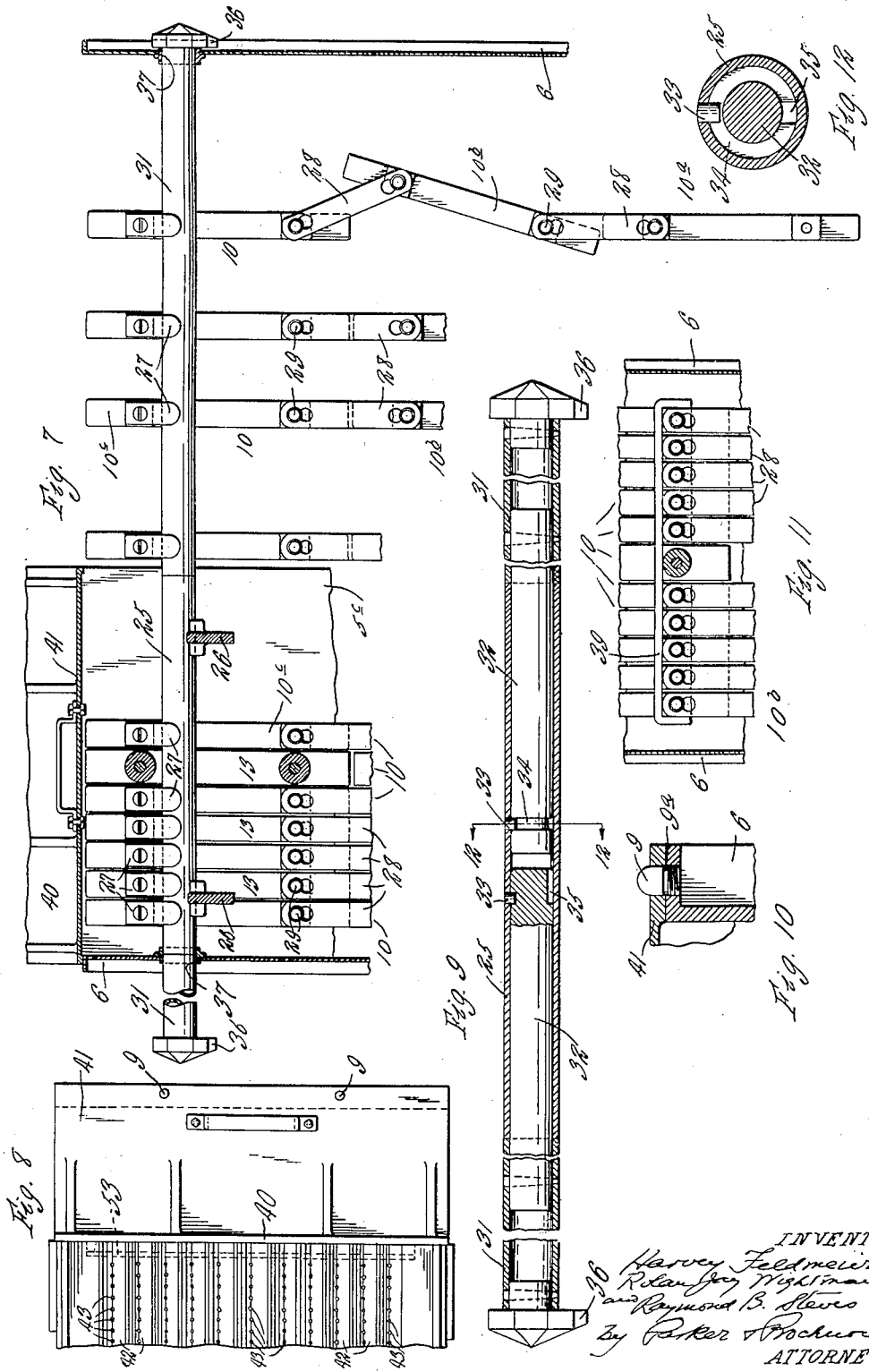

1,893,135

UNITED STATES PATENT OFFICE

HARVEY FELDMEIER AND ROLAN JAY WIGHTMAN, OF LITTLE FALLS, AND RAYMOND B. STEVES, OF ILION, NEW YORK, ASSIGNORS TO CHERRY-BURRELL CORPORATION, OF WILMINGTON, DELAWARE, A CORPORATION OF DELAWARE

HEAT EXCHANGE DEVICE

Application filed August 11, 1930. Serial No. 474,472.

This invention relates to heat exchange devices adapted for cooling or heating liquids such as milk, and more particularly to improvements in heat exchange devices such as disclosed in United States application filed Oct. 14, 1929, Serial No. 399,462, by Harvey Feldmeier, which has now matured into Patent No. 1,840,573, issued Jan. 12, 1932, in which a plurality of heat exchange units are normally arranged compactly side by side or face to face and connected for the flow of a medium through them to effect an exchange of heat between the same and a liquid contacting with the external surfaces of the units, but are mounted to enable a relative separation of the units to make the several parts of the device readily accessible.

One object of the invention is to provide an efficient and desirable heat exchange device composed of relatively separable units, which is of large capacity but small size, and of an improved construction that facilitates the cleaning and repairing thereof.

Other objects of our invention are to provide a heat exchange device of this type in which the separable heat exchange units are composed of sections flexibly connected so as to permit relative movement between the sections of each unit to facilitate the cleaning thereof, and preferably also permit the ready removal of any section or sections to facilitate repairs to the device; also to provide means which will prevent any fluid which may leak from the joints of the device from reaching the liquid flowing in contact with the outer surface of the heat exchange units; also to construct the liquid distributor for the liquid which flows externally over the heat exchange surfaces so as to prevent waste of the liquid or escape of foam from the distributor; also to provide tracks or supports adapted to be secured in position to form extended supports for the heat exchange units when separating them; also to provide a liquid distributor of novel construction adapted to insure a uniform distribution of the liquid over the heat exchange surfaces and to minimize the waste or escape of the liquid or foam; also to provide the device with a bottom trough which is adapted to be readily removed and which will prevent contact of the liquid being treated with the treating medium; also to provide simple and efficient means for holding together in their normal position the return ends of the heat exchange units; also to provide the heat exchange units and the distributor with cooperating baffles or curbs which prevent contact or contamination of the liquid being treated by the treating medium; also to improve heat exchange devices in the other respects hereinafter described and set forth in the claims.

In the accompanying drawings:

Fig. 1 is a side elevation on a reduced scale, of a heat exchange device embodying our invention.

Fig. 2 is a fragmentary, horizontal, sectional plan view thereof on an enlarged scale on line 2—2, Fig. 6.

Fig. 3 is a transverse, sectional elevation of the lower portion of the device on line 3—3, Fig. 6.

Fig. 4 is a fragmentary, transverse section of the upper portion of the device on line 4—4, Fig. 6.

Fig. 5 is a perspective view of one end of the bottom trough.

Fig. 6 is a longitudinal sectional elevation of the device.

Fig. 7 is a fragmentary, transverse, sectional elevation thereof on line 7—7, Fig. 6, showing a portion of the heat exchange units in their normal close relation, and a portion of the units separated and supported on the extension tracks, as when cleaning the device.

Fig. 8 is a plan view of one end of the liquid distributor.

Fig. 9 is an enlarged, broken sectional elevation of one of the track supports for the heat exchange units.

Fig. 10 is a detail section showing one of the retaining devices for the removable liquid distributor.

Fig. 11 is a fragmentary, sectional elevation on line 11—11, Fig. 6, showing one of the holding yokes for the return ends of the heat exchange units.

Fig. 12 in a transverse section, enlarged, on line 12—12, Fig. 9 of the supporting track for the heat exchange units.

In the device illustrated in the drawings as the preferred embodiment of the invention, a plurality of heat exchange units are arranged side by side and adapted to be positioned in close relation to one another, and provision is made so that a temperature changing medium can be circulated through these units for cooling or heating a liquid flowing over the external surfaces of the units. Said units are supported so that they can be relatively separated or moved apart laterally of themselves to provide space between adjacent units to facilitate cleaning the parts of the device. The milk or other liquid to be treated is delivered by a distributor at the upper portion of the device so as to flow down uniformly externally over the heat exchange surfaces of the several units.

For the sake of brevity and clarity of description, the liquid to be treated will be hereinafter referred to as "milk" and the water, brine or other temperature-changing medium as "water", but it will be understood that it is not thereby intended to limit the invention to the employment of these mediums in the use of the device.

As illustrated, the device includes a cabinet or casing 1 within which the heat exchange units are adapted to be enclosed and protected in their operative close or compact arrangement, indicated in Figs. 2 and 3. The cabinet comprises a base 2 having upright ends 3 connected by longitudinal rods or braces 4; vertical end walls 5, each of which is built up of a plurality of similar sections or panels 5a, 5b and 5c, suitably bolted or secured end to end to each other and to the ends 3 of the base; and two opposite side closure members or walls 6 which extend upwardly from the base and from one to the other of the end walls 5, and are movable to open the cabinet and afford access to and permit the separation of the heat exchange units of the device. These side walls 6 of the cabinet may be and preferably are mounted so as to be bodily movable outwardly or laterally away from the heat exchange units so that when moved outwardly they leave the opposite sides of the cabinet open and permit the heat exchange units to be moved outwardly through these open sides. The top of the cabinet is preferably formed by a removable milk distributor 7 hereinafter described.

The side walls 6 may be releasably secured in closed position against the upright front and rear edges of the end walls 5 by any suitable means, such as latches or hooks 8, and the top closure or milk distributor 7 is preferably removably seated on the upper ends of the end walls 5 of the cabinet, being held in place thereon by studs 9 entering holes 9a in the ends of the top. The top can be readily lifted off or removed to facilitate cleaning the milk distributor and to leave the tops of the heat exchange units accessible.

Within the cabinet a group or plurality of vertically disposed heat exchange units 10 are arranged side by side or face to face extending lengthwise of the cabinet, parallel with and between the removable side walls 6 so that when the side walls are removed, the outermost units of the group are exposed and the movable units can be moved outwardly through the open sides of the cabinet. Each of the heat exchange units is preferably composed of a plurality of similar sections 10a, 10b and 10c, each comprising horizontal heat exchange tubes 11 extending between and connecting opposite end headers 12 and 13.

One of the heat exchange units, preferably though not necessarily the central unit, may be stationarily mounted in the cabinet by connection of its headers 12 and 13 to the end walls 5 of the cabinet. The headers 12 and 13 may be constructed in the well known way shown at the lower portion of Fig. 6, so that the water entering the header 12 through an inlet will circulate back and forth through the tubes 11 of this section in series and through the header 12 and return header 13 and discharge through an outlet. Each section of the other or movable units may be of similar construction. The sections of each unit may either be connected so that the same water or medium can be circulated through the sections, or they may be connected to sources of different mediums so that one medium, for instance, cold water, can be circulated through one or more sections, and a different medium such as brine at a lower temperature, can be circulated through another section or sections.

Suitable connections are provided for causing the circulation of water through all of the units. For example, as shown, the heater 12 of each section of the central unit is provided with water inlet and outlet pipes 14 and 15, and the sections of the several movable and stationary units are connected to each other by separable water connections between the headers 12 of the sections of adjacent units so that water delivered to the stationary unit will pass into and similarly circulate through the sections of all of the units. For this purpose the headers 12 are provided at opposite sides with water passages 16 through which the headers 12 of the corresponding sections of the several units communicate at their upper and lower portions with each other, and the headers 12 of the several units are adapted to be clamped together face to face, so as to provide water-tight joints surrounding the communicating water passages 16. To form these joints, in the construction shown, each header 12 is provided at one side thereof with a nipple 17 surrounding the water passage 16 and adapted to enter a rabbet surrounding the water passage 16 in the adjacent side of the adjacent header, and a packing gasket 18 surrounds this nipple between the opposing faces of the headers. The headers of the several sections may be clamped together with the interposed packing gaskets between them by bolts 19 which extend through the water passages 16 of the headers 12. Each clamping bolt is provided at one end with a head 20, Fig. 2, adapted to bear against a similar packing gasket 18 between the bolt head and the header of the outermost unit at one end of the group, and a nut 21 screwed on the threaded opposite end of the clamping bolt is adapted to bear against a similar packing gasket 18 between the nut and the outermost header at the opposite end of the group. The head 20 of the clamping bolt is also preferably provided with a handle portion 22 for turning the bolt to clamp and release the units. By screwing up this bolt, the headers 12 of the several units are clamped together with the interposed packing gaskets, and thus join the headers with water tight joints so that the water admitted to the stationary header will pass into the headers 12 of the other units. Preferably there are two of the clamping bolts 19 for the corresponding sections of the several units, or in other words, when, as shown in the drawings, each unit comprises three sections, there are six clamping bolts which clamp together all of the sections of the several units. The gaskets 18 are preferably flat paper gaskets or rings which are inexpensive and can be replaced by new gaskets after each separation and cleaning of the units.

The upper sections of the several movable units are normally supported in the cabinet on transverse horizontal tracks or supports 25, stationarily mounted in the cabinet as by brackets 26 secured to the end walls 5c of the cabinet, the headers 12 and 13 of the upper sections of the units being provided with shoes or members 27 of any suitable sort adapted to bear and travel on the tracks 25. The remaining sections of each unit are hung from the top section, preferably being flexibly and detachably connected to the top section and to each other by links 28, each pivoted by studs 29 to the ends of the two adjacent headers. As shown, the studs 29, which may be screwed into threaded holes in the headers, are provided with reduced necks 30, and the links 28 are provided with keyhole slots to receive the studs, the keyholes having reduced outer ends adapted to loosely fit the necks of the studs and inner ends large enough to pass over the round heads of the studs, so that the links can be readily disengaged from the studs by shifting the links to bring the large ends of the keyholes into axial registration with the studs. By means of these swinging links 28, the section 10b is pivotally hung from the top section 10c, and the bottom section 10a is similarly pivotally hung from the intermediate section 10b. The flexible connections between the sections thus secured not only insure that all of the joints of the water passages between the several units will be water tight when the units are clamped together by the bolts, but in addition, the upper and lower ends of the sections 10a, 10b and 10c can be swung laterally out of line with each other, as indicated at the right hand end of Fig. 7, to facilitate the cleaning of the sections. Furthermore, the quickly detachable links permit any section or sections to be readily disconnected and removed, if this is necessary, for repairing the same or for other purpose.

In order to facilitate the separation of the units and support the movable units during their movement away from each other and from the stationary unit and when in their spaced relation, extension tracks 31 are provided adapted to be stationarily secured in position projecting outwardly from the opposite ends of and in line with the stationary tracks 25. Preferably, each of these track extensions is removable and is adapted to be rigidly secured as by a bayonet joint to one end of one of the stationary tracks 25. As shown, see Figs. 7 and 9, the stationary track 25 is tubular and the track extension 31 consists of a tube of like diameter provided at its inner end with a rigidly attached rod 32 which projects out of the tube and is adapted to be inserted into the tubular track 25 and be retained therein by engagement of an inwardly projecting stud 33 in the tubular track 25 into a circumferential groove 34 in the rod 32. The end of the rod 32 is provided with a longitudinal groove 35 joining the groove 34 and through which the stud 33 may pass into the groove 34. To secure the track extension to the stationary track 25, the rod 32 of the track extension is inserted into the end of the tubular track 25 with the groove 35 in line with the pin 33, and after the rod is shoved in to the limit, the track extension is turned a part revolution to engage the pin 33 in the circumferential groove 34, out of registration with the groove 35, thereby locking the track extension in place. The track extension can thus be readily secured in rigid connection with the track 25 and be readily disconnected therefrom for cleaning. When the track extensions are attached to the stationary tracks they project outwardly from the opposite ends thereof, as shown in Fig. 7, with the surfaces of the track and extensions flush with each other, and the movable heat exchange units can be moved or slid on the track extensions out of the open sides of the cabinet, one or more at a time, and if desired, into the spaced relation to each other shown in Fig. 7. Radial pointers 36 may be provided on the outer ends of the track extensions in line with the grooves 35, to indicate the positions of these grooves and facilitate the connection of the extensions to and their removal from the tracks.

In an apparatus for treating or handling milk, it is important to thoroughly clean the apparatus after each run of the milk through the same, and the apparatus described is constructed so that after each run of the milk the cabinet can be easily opened up and the units separated by placing the track extensions 31 in supporting position through guide holes 37 provided for that purpose in the movable side walls 6 of the cabinet. The side walls can be then slid outwardly on the track extensions which support the side walls, as indicated at the right hand end of Fig. 7. Then, after the clamping bolts 19 have been removed to release the units, the first unit can be moved out of the cabinet on and supported by the track extensions 31 to a position in which access is afforded to all sides of this unit and enables the ready and thorough cleaning of the same. Each of the movable units can thus be moved out and cleaned in succession, and when the several movable units have been moved out, access is afforded to the stationary central section which can then be readily and thoroughly cleaned.

38 represents covers for the holes 36 hinged on the side walls 6.

After the apparatus has been cleansed, the sections are moved back into position in the cabinet and clamped together by means of the clamping bolts 19, and the sides 6 closed, ready for the next operation.

The clamping bolts 19 are employed only for the headers 12 at one end of the units. It is desirable to also secure the units together at their opposite ends so that the units will be held with the heat exchange tubes in the intended parallel relation and in the vertical planes of the discharge openings of the milk distributor. For this purpose, the other or return headers 13 of the units are preferably clamped or secured by yokes or hooked rods 39, Figs. 6 and 11, which are adapted to be engaged with lugs 39a projecting from the return headers of the outermost units of the group. One of these yokes 39 is shown for each of the three sections of the units.

The milk distributor preferably consists of a covered trough 40 provided with end brackets or extensions 41, by which it is removably supported on the upper ends of the end walls 5 of the cabinet, the trough being centered and retained in position on the cabinet by the studs 9 before described. The bottom of the trough is provided with longitudinal grooves 42, one located above and in the vertical plane of the top tube of each heat exchange unit, see Fig. 4, and each groove is provided with a longitudinal row of perforations 43 through which the milk is adapted to discharge from the trough onto the uppermost tube of the unit. The milk is delivered to the distributor trough preferably by a perforated pipe strainer 45 arranged longitudinally in the trough and suitably connected to a milk supply pipe 46. The distributor trough is closed by a removable cover 47 which is adapted to rest upon the top edges of the trough and is preferably provided with a depending marginal flange 48 which extends continuously around the sides and ends of the cover and depends therefrom, being adapted to dip into the body of milk in the bottom of the trough, thereby forming a trap or liquid seal. The discharge perforations 43 of the trough are so proportioned that the milk discharging from the perforated pipe 45 into the trough will accumulate in the bottom of the trough to a sufficient depth to extend above the lower edge of the cover flange 48 to form the liquid seal. Thus, if there is any splashing or foaming of the milk in the trough, due to the discharge of the milk from the perforated pipe, the trap or seal formed by the depending flange prevents the milk from splashing out of the trough or the foam from rising and escaping over the top edges of the walls of the trough.

In the event of a leak in any of the joints of the water connections, it is important to prevent the water from coming in contact with and contaminating the milk flowing over the heat exchange surfaces or tubes. It is also desirable to prevent the milk from spreading or running lengthwise on the tubes far enough to reach the headers at the opposite ends of the tubes, and also to limit the lengthwise spread of the milk on the heat exchange tubes so that there is no danger of the milk flowing off of the lower ends of the heat exchange units outwardly beyond the ends of the bottom trough or receiver of the device, and thus being wasted and getting on the outer surfaces of the bottom trough. Any fluid leaking from the joints of the water connections is prevented from spurting or flowing along the faces of the headers and reaching the heat exchange tubes by the provision of suitable baffles or guards. These baffles in the construction shown are formed by a vertical rib 50 projecting from one side of each header 12 into a vertical groove 51 in the opposing surface of the adjacent header, see Figs. 2 and 6. Any fluid leaking from the joints between the headers and moving horizontally along the side faces of the headers will be intercepted by the ribs 50 which will act as curbs to direct the fluid downwardly along these ribs and the grooves into which they extend, and thus prevent the fluid from reaching the heat exchange tubes.

The flow of the milk horizontally or lengthwise along the heat exchange tubes toward the end headers is limited by curbs or obstructions preferably consisting of vertical strips 52 adjacent the ends of the tubes of each of the unit sections and through holes in which the tubes pass. Preferably the lower ends of these curb strips on one unit section incline inwardly or are located so as to overlap somewhat the upper ends of the curb strips on the next lower section, and so that the lower ends of the curb strips on the lowest sections are disposed inside of the transverse vertical planes of the ends of the bottom trough. Thus, the milk flowing down over the outer surfaces of the heat exchange units is prevented from flowing onto the headers and is also prevented from flowing onto the end walls of the bottom trough and escaping or getting onto the outer surfaces of the trough ends. While the curbs 52 are located and arranged so as to prevent the milk from flowing laterally along the tubes towards the ends of the units far enough to fall on the ends of the bottom receiving trough 60 or outside of the trough, the baffles 50 are preferably located and arranged, as shown in the drawings, outwardly beyond the vertical planes of the ends of the bottom trough 60 so that in the event of a leak in any of the joints of the connections for the temperature changing fluid between the units, such leaking fluid will be prevented from dripping into the bottom trough and contaminating the milk.

Cooperating with these vertical curb strips 52 are transverse baffles or flanges 53 which depend slightly from the bottom of the distributing trough inside of the vertical planes of the curb strips 52 on the top sections of the units. These baffle flanges prevent the milk from running along the bottom of the trough and flowing onto the curb strips 52 or on the ends of the tubes outwardly beyond the curbs.

The removable side walls 6 of the cabinet are also preferably provided along their bottoms with deflecting flanges 54 which incline inwardly over the top edges of the side walls of the bottom trough and act to direct any milk which may spatter from the heat exchange tubes onto the inner surfaces of the side walls 6 and run down said surfaces into the bottom trough and prevent it from flowing onto the walls of and getting outside of the trough.

The bottom trough or receiver 60 which receives the downwardly flowing milk from the heat exchange units is preferably removably supported between the ends of the base 3 so that this trough can be detached and removed when desired. For this purpose the bottom trough 60 is preferably provided with end extensions 61, Figs. 5 and 6, conveniently formed by continuations of the front and rear side walls of the trough, which extensions are removably secured as by bolts 62 to flanges 63 projecting inwardly from the vertical ends of the base 3.

We claim as our invention:

1. A heat exchanger for liquids, comprising a plurality of heat exchange units arranged side by side and relatively separable laterally from one another, supports for the movable units, movable extension supports, and means for securing said extension supports in position for supporting said movable units when separated.

2. A heat exchanger for liquids, comprising a plurality of heat exchange units arranged side by side and relatively separable laterally from one another, stationary tracks for supporting the movable units, movable extension tracks, and means for stationarily securing said extension tracks in line with said stationary tracks to form supporting extensions thereof for said movable units.

3. A heat exchanger for liquids, comprising a plurality of heat exchange units arranged side by side and relatively separable laterally from one another, stationary tracks for supporting the movable units, and track extensions constructed to be removably secured to said stationary tracks and form rigid supporting extensions thereof for said movable units.

4. A heat exchanger for liquids comprising a plurality of heat exchange units arranged side by side and relatively separable laterally from one another, stationary tracks for supporting the movable units, and track extensions having bayonet joint connections with said stationary tracks to removably secure said track extensions rigid with and extending outwardly from said stationary tracks.

5. A heat exchanger for liquids comprising a plurality of heat exchange units arranged side by side and relatively separable laterally from one another, a cabinet which houses said units when disposed close together, said cabinet having a closure movable to permit relative separation of said units, extension supports, and means for securing said extension supports in position to movably support said closure and said movable units when separated.

6. A heat exchanger for liquids, comprising a plurality of heat exchange units arranged side by side and relatively separable laterally from one another, a cabinet which houses said units when disposed close together, said cabinet having a closure movable to permit relative separation of said units, tracks in said cabinet for supporting said units, track extensions, and means for securing said track extensions in line with said tracks and extending through guide holes in said closure, said closure and said movable units being movable on said track extensions.

7. A heat exchanger for liquids, comprising a plurality of heat exchange units arranged side by side and relatively separable from one another, each of said units comprising sections flexibly connected to each other to allow relative movement of the sections of a unit to positions in which the adjacent ends of adjacent sections are accessible for cleaning.

8. A heat exchanger for liquids, comprising a plurality of heat exchange units arranged side by side and relatively separable from one another, each of said units comprising a plurality of sections, means flexibly connecting said sections and normally supporting the sections of a unit in alinement with each other, said flexible connections being constructed to allow relative movement of the sections of a unit to positions in which their adjacent ends are out of alinement.

9. A heat exchanger for liquids, comprising a plurality of units arranged side by side and relatively separable from one another, each of said units comprising a plurality of sections, and means which flexibly connect said sections together, and also detachably connect the sections to permit the removal of any desired section or sections.

10. A heat exchanger for liquids, comprising a plurality of units arranged side by side and relatively separable from one another, each of said units comprising a plurality of sections, studs projecting from said sections, links pivoted by said studs to the sections for normally supporting said sections in alinement, said links being pivotally movable to permit relative movement of the sections of a unit, and said links being detachable to enable the removal of any desired section or sections.

11. A heat exchanger for liquids, comprising a plurality of heat exchange units arranged side by side and relatively separable from one another, means connecting said units for the passage of a fluid from one unit to another, means for causing a liquid to flow over the heat exchange surfaces of said units, and baffles which are located between adjacent sides of adjacent units and prevent any fluid which may leak from said fluid connections from reaching the heat exchange surfaces of said units.

12. A heat exchanger for liquids, comprising a plurality of vertical units arranged side by side and having heat exchange surfaces over which a liquid flows, means providing fluid connections between adjacent units, and a vertical baffle projecting from one unit and entering a vertical groove in the adjacent side of the adjacent unit between said fluid connections and said heat exchange surfaces for preventing fluid leaking from said fluid connections from reaching the liquid flowing over said units.

13. A heat exchanger for liquids, comprising a plurality of vertical units arranged side by side and each comprising a header and heat exchange tubes, fluid connections between the headers of adjacent units for the passage of fluid from one unit to another, means for flowing a liquid over said tubes, and a vertical baffle projecting from the header of one unit and entering a vertical groove in the adjacent side of the adjacent unit for preventing fluid leaking from said fluid connections from reaching the liquid flowing on said heat exchange tubes.

14. A heat exchanger for liquids, comprising a plurality of heat exchange units arranged side by side and relatively separable from one another, means connecting said units for the passage of a fluid from one unit to another, means for causing a liquid to flow over the heat exchange surfaces of said units, and baffles which are located between said fluid connections and said heat exchange surfaces for preventing fluid which may leak from said connections from reaching said heat exchange surfaces.

15. A heat exchanger for liquids, comprising laterally separable heat exchange units having surfaces over which a liquid flows and passages for the flow of a temperature changing fluid, a device for receiving the liquid flowing off of said heat exchange surfaces, connections for supplying the temperature changing fluid to said flow passages of said units, and a baffle arranged to prevent fluid which may leak from said connections from reaching said heat exchange surfaces and to direct such leaking fluid away from said receiving device.

16. A heat exchanger for liquids, comprising laterally separable heat exchange units having surfaces over which a liquid flows and passages for the flow of a temperature changing fluid, a device for receiving the liquid flowing off of said heat exchange surfaces, connections for supplying the temperature changing fluid to said flow passages of said units, a curb for limiting the lateral travel of said liquid on said heat exchange surfaces and directing the liquid into said receiving device, and a baffle which is located between said connections and said curb and is arranged to direct such leaking fluid away from said receiving device.

17. A heat exchanger for liquids comprising heat exchange units arranged side by side, connecting means for the passage of a fluid from one unit to another, means for causing a liquid to flow over the heat exchange surfaces of said units, and baffle means located between said connecting means and said heat exchange surfaces for preventing fluid which may leak from said connecting means from reaching said heat exchange surfaces.

18. A heat exchanger for liquids comprising a plurality of heat exchange units arranged side by side and relatively separable from one another, connections by which fluid is supplied to said units and which are constructed to allow separation of the units, means for causing a liquid to flow in contact with the heat exchange surfaces of said units in heat exchange relation with said fluid, and baffles arranged to prevent fluid which may leak from said connections from reaching the portions of said heat exchange surfaces with which said liquid contacts.

HARVEY FELDMEIER.
ROLAN JAY WIGHTMAN.
RAYMOND B. STEVES.